United States Patent
Ikeda et al.

(10) Patent No.: US 9,007,040 B2
(45) Date of Patent: Apr. 14, 2015

(54) DC-DC POWER CONVERSION APPARATUS

(75) Inventors: Matahiko Ikeda, Chiyoda-ku (JP);
Masaru Kobayashi, Chiyoda-ku (JP);
Hirotoshi Maekawa, Chiyoda-ku (JP);
Naoki Moritake, Chiyoda-ku (JP);
Takao Mitsui, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 452 days.

(21) Appl. No.: 13/635,108

(22) PCT Filed: Nov. 4, 2010

(86) PCT No.: PCT/JP2010/069558
§ 371 (c)(1),
(2), (4) Date: Sep. 14, 2012

(87) PCT Pub. No.: WO2012/001828
PCT Pub. Date: Jan. 5, 2012

(65) Prior Publication Data
US 2013/0002215 A1    Jan. 3, 2013

(30) Foreign Application Priority Data
Jun. 29, 2010 (JP) .................. 2010-147327

(51) Int. Cl.
*G05F 1/59* (2006.01)
*H02M 3/158* (2006.01)

(52) U.S. Cl.
CPC .................... *H02M 3/158* (2013.01)

(58) Field of Classification Search
USPC ................. 323/222, 271, 282, 284
See application file for complete search history.

(56) References Cited

U.S. PATENT DOCUMENTS 5,726,870 A    3/1998    Lavieville et al.
6,215,286 B1 *  4/2001    Scoones et al. ............... 323/222
(Continued)

FOREIGN PATENT DOCUMENTS

AU    729687 B2    1/1999
EP    2485376 A1    8/2012
(Continued)

OTHER PUBLICATIONS

Chinese Office Action issued Jul. 25, 2014, Patent Application No. 201080067751.5.
(Continued)

*Primary Examiner* — Jeffrey Sterrett
(74) *Attorney, Agent, or Firm* — Sughrue Mion, PLLC; Richard C. Turner

(57) ABSTRACT

Disclosed is a DC-DC power conversion apparatus (10) including two or more switching units (SU1, SU2) each of which further includes two semiconductor switching elements (Sa, Sb), and wherein each of the semiconductor switching elements (S1a, S1b, S2a, S2b) of each of the switching units are all connected in series, and which also includes an energy transition capacitor (C1) for conducting charging/discharging, and an inductor (L). The DC-DC power conversion apparatus (10) is also provided with a control unit that makes the semiconductor elements execute operations in four types of switching modes, according to the ratio (V2/V0) of the input/output voltages of the power conversion apparatus and the direction of the power transmission, and that also makes the elements carry out a current-discontinuing operation wherein the inductor current will become zero during switching operation, upon low load.

8 Claims, 12 Drawing Sheets

(56) References Cited

U.S. PATENT DOCUMENTS

| | | | |
|---|---|---|---|
| 6,765,371 B2* | 7/2004 | Kataoka | 323/222 |
| 6,798,177 B1* | 9/2004 | Liu et al. | 323/222 |
| 7,199,563 B2* | 4/2007 | Ikezawa | 323/266 |
| 7,248,030 B2* | 7/2007 | Yoshino | 323/284 |
| 7,733,072 B2* | 6/2010 | Kanakubo | 323/271 |
| 7,804,282 B2* | 9/2010 | Bertele | 323/222 |
| 7,812,575 B2* | 10/2010 | Shimada et al. | 323/222 |
| 8,138,744 B2* | 3/2012 | Nagano et al. | 323/350 |
| 8,143,865 B2* | 3/2012 | Grant | 323/222 |
| 8,274,264 B2* | 9/2012 | Prodic et al. | 323/222 |
| 8,791,672 B2* | 7/2014 | Klein et al. | 323/222 |
| 8,928,302 B2* | 1/2015 | Namekawa | 323/285 |
| 2005/0174098 A1 | 8/2005 | Watanabe et al. | |
| 2012/0126764 A1 | 5/2012 | Urakabe et al. | |
| 2013/0002215 A1* | 1/2013 | Ikeda et al. | 323/271 |
| 2013/0002227 A1* | 1/2013 | Ikeda et al. | 323/311 |
| 2013/0119961 A1* | 5/2013 | Okuda et al. | 323/299 |
| 2014/0152276 A1* | 6/2014 | Kobayashi et al. | 323/271 |

FOREIGN PATENT DOCUMENTS

| | | |
|---|---|---|
| JP | 06-067181 B2 | 8/1994 |
| JP | 3414749 B2 | 6/2003 |
| JP | 2006-262619 A | 9/2006 |
| WO | 2008/032362 A1 | 3/2008 |
| WO | 2008032362 A1 | 3/2008 |

OTHER PUBLICATIONS

European Patent Office (Search Report), issued Oct. 24, 2013, Patent Application No. 108541251.

* cited by examiner

DC-DC POWER CONVERSION APPARATUS

CROSS REFERENCE TO RELATED APPLICATIONS

This application is a National Stage of International Application No. PCT/JP2010/069558, filed on Nov. 4, 2010, which claims priority from Japanese Patent Application No. 2010-147327, filed on Jun. 29, 2010, the contents of all of which are incorporated herein by reference in their entirety.

TECHNICAL FIELD

The present invention relates to a DC-DC power conversion apparatus that converts a DC voltage to a stepped-up or stepped-down DC voltage.

BACKGROUND ART

There is a DC-DC power conversion apparatus in the related art having two or more switching units each of which includes two or more semiconductor switching elements that perform switching operations complementarily. All the semiconductor switching elements of the respective switching units are connected in series. The DC-DC power conversion apparatus also has an energy transition capacitor and an inductor. DC-DC conversion is performed using charging/discharging of the energy transition capacitor by switching operations of the semiconductor switching elements of the respective switching units. Low-voltage withstanding semiconductor switching elements and a small inductor can be used and a ratio of an input voltage and an output voltage can be adjusted by changing ON-duties of the semiconductor switching elements (for example, see Patent Document 1).

RELATED ART DOCUMENTS

Patent Document

Patent Document 1: Japanese Patent No. 3414749

Non-Patent Document

Non-Patent Document 1: Thierry A. Meynard et al: "Multi-cell Converters: Basic Concepts and Industry Applications", IEEE TRANSACTIONS ON INDUSTRIAL ELECTRONICS, VOL. 49, NO. 5, OCTOBER 2002

SUMMARY OF THE INVENTION

Problem to be Solved by the Invention

The DC-DC power conversion apparatus in the related art uses the energy transition capacitor and the inductor to perform DC-DC power conversion using charging/discharging of the energy transition capacitor, and low-voltage withstanding semiconductor switching elements and a small inductor can be used.

In the DC-DC power conversion apparatus in the related art, however, two semiconductor switching elements perform switching operations complementarily. Accordingly, a certain ripple current flows through the inductor independently of an amount of load, and a loss occurs because this current flows further through the energy transition capacitor and the semiconductor switching elements. Hence, power conversion efficiency is low under low load.

Meanwhile, when an inductance value of the inductor is increased, a ripple current decreases and therefore a loss can be lessened. Hence, it becomes possible to increase power conversion efficiency under low load. However, when an inductance value is increased, there arises a problem that a volume and a weight of the inductor are increased and so are a volume and a weight of the DC-DC power conversion apparatus.

The invention is devised to solve the problem as above and has an object to provide an improved DC-DC power conversion apparatus capable of reducing a loss under low load even when a small and light inductor having a small inductance value is used.

Means for Solving the Problems

A DC-DC power conversion apparatus of the invention has two or more switching units each of which includes two semiconductor switching elements Sa and Sb performing switching operations, which semiconductor switching elements of the respective switching units are all connected in series, an energy transition capacitor for conducting charging/discharging according to the switching operations of the respective semiconductor switching elements of the respective switching units, and an inductor. The DC-DC power conversion apparatus is provided with a control unit that makes the semiconductor switching elements of the switching units execute switching operations in four types of switching modes, according to a ratio of input/output voltages of the DC-DC power conversion apparatus and a direction of power transmission in the DC-DC power conversion apparatus, and also makes the semiconductor switching elements carry out a current-discontinuing operation wherein a current flowing through the inductor becomes 0 during the switching operations under low load.

Advantage of the Invention

According to the DC-DC power conversion apparatus of the invention, because the DC-DC power conversion apparatus has means for performing operations in four types of switching modes according to a ratio of input/output voltages of the DC-DC power conversion apparatus and a direction of power transmission in the DC-DC power conversion apparatus, the semiconductor switching elements perform a current-discontinuing operation with which an inductor current becomes 0 under low load. Hence, even when a small inductor having a small inductance value is used, a ripple current through the inductor under low load decreases and losses in the energy transition capacitor, the inductor, and the semiconductor switching elements can be lessened. It thus becomes possible to increase power conversion efficiency under low load.

The foregoing and other objects features, aspects, and advantages of the present invention will become more apparent from the following detailed description of the present invention when taken conjunction with the accompanying drawings.

MODE FOR CARRYING OUT THE INVENTION

Figure 1:
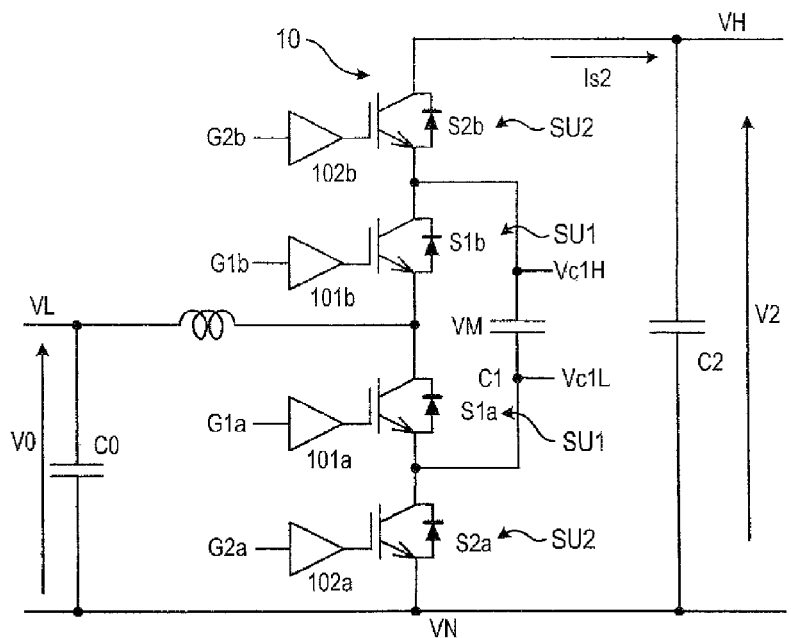
FIG. 1 is an electrical circuit diagram showing a configuration of a main circuit of a DC-DC power conversion apparatus according to a first embodiment of the invention.

Hereinafter, embodiments of the invention will be described with reference to the drawings. In the respective drawings, same reference numerals denote same or equivalent portions.

First Embodiment

FIG. 1 is an electrical circuit diagram showing a configuration of a main circuit of a DC-DC power conversion apparatus 10 according to a first embodiment of the invention.

The DC-DC power conversion apparatus 10 of the first embodiment is a two-way DC-DC power conversion apparatus furnished with a step-up function of converting a DC voltage V0 inputted between a voltage terminal VL and a voltage terminal VN to a stepped-up DC voltage V2 and outputting the DC voltage V2 between a voltage terminal VH and the voltage terminal VN, and a step-down function of converting the DC voltage V2 inputted between the voltage terminal VH and the voltage terminal VN to the stepped-down DC voltage V0 and outputting the DC voltage V0 between the voltage terminal VL and the voltage terminal VN.

Referring to FIG. 1, the main circuit of the DC-DC power conversion apparatus 10 includes smoothing capacitors C0 and C2 that smooth input/output DC voltages V0 and V2, respectively, a smoothing capacitor C1 functioning as an energy transition capacitor, a plurality of semiconductor switching elements S1a, S1b, S2a, and S2b, and an inductor L. The semiconductor switching elements S1a and S1b form a switching unit S31 and the semiconductor switching elements S2a and S2b form a switching unit SU2.

Each of the semiconductor switching elements S1a, S1b, S2a, and S2b is formed of an IGBT (Insulated Gate Bipolar Transistor) and a diode connected to the IGBT in antiparallel.

The IGBT of each of the semiconductor switching elements S1a, S1b, S2a, and S2b has a collector terminal, an emitter terminal, and a gate terminal. The diode of each of the semiconductor switching elements S1a, S1b, S2a, and S2b is connected between the collector terminal and the emitter terminal of the IGBT of the corresponding semiconductor switching element S1a, S1b, S2a, or S2b in antiparallel so that an anode terminal is connected to the emitter terminal.

Connections of the DC-DC power conversion apparatus 10 will be described in detail.

The emitter terminal of the IGBT of the semiconductor switching element S1b is connected to a voltage terminal VM and the collector terminal thereof is connected to a high-voltage end terminal of the smoothing capacitor (energy transition capacitor) C1. The emitter terminal of the IGBT of the semiconductors switching element S1a is connected to a low-voltage end terminal of the smoothing capacitor (energy transition capacitor) C1 and the collector terminal thereof is connected to the voltage terminal VM. The emitter terminal of the IGBT of the semiconductor switching element S2b is connected to a high-voltage end terminal of the smoothing capacitor (energy transition capacitor) C1 and the collector terminal thereof is connected to a high-voltage end terminal of the smoothing capacitor C2. The emitter terminal of the IGBT of the semiconductor switching element S2a is connected to a low-voltage end terminal of the smoothing capacitor C2 and the collector terminal thereof is connected to the low-voltage end terminal of the smoothing capacitor (energy transition capacitor) C1.

A low-voltage end terminal of the smoothing capacitor C0 is connected to the voltage terminal VN and a high-voltage end terminal of the smoothing capacitor C0 is connected to the voltage terminal VL. The low-voltage end terminal of the smoothing capacitor C2 is connected to the voltage terminal VN and the high-voltage end terminal of the smoothing capacitor C2 is connected to the voltage terminal VH. One end of the inductor L is connected to the voltage terminal VL and the other end is connected to the voltage terminal VM.

The gate terminal of the IGBT of the semiconductor switching element S1b is connected to an output terminal of a gate drive circuit 101b and a gate signal G1b is inputted into an input terminal of the gate drive circuit 101b. The gate terminal of the IGBT of the semiconductor switching element S1a is connected to an output terminal of a gate drive circuit 101a and a gate signal G1a is inputted into an input terminal of the gate drive circuit 101a. The gate terminal of the IGBT of the semiconductor switching element 32b is connected to an output terminal of a gate drive circuit 102b and a gate signal G2b is inputted into an input terminal of the gate drive circuit 102b. The gate terminal of the IGBT of the semiconductor switching element S2a is connected to an output terminal of a gate drive circuit 102a and a gate signal G2a is inputted into an input terminal of the gate drive circuit 102a.

Figure 2:
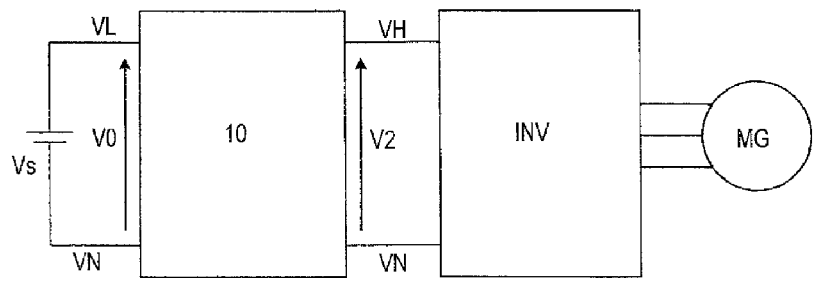
FIG. 2 is a view of an overall configuration showing a connection relation among a power supply, a motor generator, and the DC-DC power conversion apparatus according to the first embodiment of the invention.

FIG. 2 is a view of an overall configuration showing connections among the DC-DC power conversion apparatus 10, a power supply, and a motor generator. A battery Vs functioning as a voltage source is connected between the voltage terminals VL and VN of the DC-DC power conversion apparatus 10 and a DC terminal of a three-phase inverter INV is connected between the voltage terminals VH and VN. A motor generator MG is connected to AC terminals of the three-phase inverter INV.

When the motor generator MG performs a power running operation, the DC-DC power conversion apparatus 10 performs a step-up operation to output a DC voltage V0 inputted between the voltage terminals VL and VN as a stepped-up DC voltage V2. When the motor generator MG performs a regenerative operation, the DC-DC power conversion apparatus 10 performs a step-down operation to output a DC voltage V2 inputted between the voltage terminals VH and VN as a stepped-down DC voltage V0.

Figure 3:
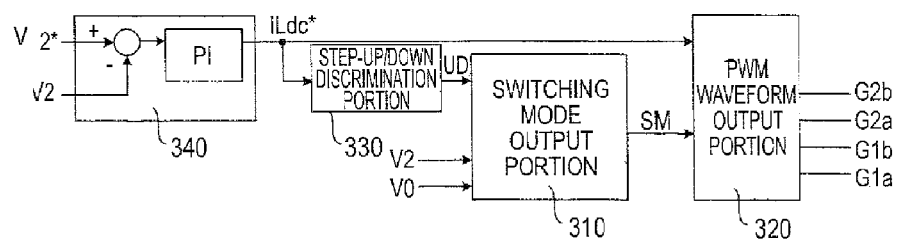
FIG. 3 is a block diagram showing a configuration of a control unit of the DC-DC power conversion apparatus according to the first embodiment of the invention.

FIG. 3 is a block diagram showing a configuration of a control unit of the DC-DC power conversion apparatus 10.

The control unit includes a switching mode output portion 310, a PWM waveform output portion 320, a step-up/down discrimination portion 330, and a computation portion 340.

The computation portion 340 receives inputs of a voltage command value V2* of the DC voltage V2 and the DC voltage V2 and outputs an inductor average current command value ILdc*. The step-up/down discrimination portion 330 receives an input of the inductor average current command value ILdc* and outputs a step-up/down signal UD. The switching mode output portion 310 receives inputs of the step-up/down signal UD and the DC voltages V0 and V2 and outputs a switching mode signal SM. The PWM waveform output portion 320 receives inputs of the switching mode signal SM and the inductor average current command value ILdC* and outputs gate signals G1a, G1b, G2a, and G2b.

The gate signals G1a, G1b, G2a, and G2b are connected to the respective semiconductor switching elements via the corresponding gate drive circuits. The semiconductor switching elements S1a, S1b, S2a, and S2b switch ON when the gate signals G1a, G1b, G2a, and G2b, respectively, are high signals and switch OFF when the gate signals G1a, G1b, G2a, and G2b, respectively, are low signals.

The computation portion 340 calculates a difference between the voltage command value V2* and the voltage V2 to perform a proportional-integral operation and outputs the result as the inductor average current command value ILdc*. Feedback control on the DC voltage V2 is performed by outputting the inductor average current command value ILdc* so that the DC voltage V2 follows the current command value V2*.

The step-up/down discrimination portion 330 determines that the ongoing operation is a step-up operation when the inductor average current command value ILdc* is positive and outputs: step-up/down signal UD=step-up signal. When the inductor average current command value ILdc* is negative, the step-up/down discrimination portion 330 determines that the ongoing operation is a step-down operation and outputs: step-up/down signal UD=step-down signal.

The switching mode selection portion 310 selects a switching mode and outputs the switching mode signal SM.

In a case where the ongoing operation is a step-up operation and a voltage ratio V2/V0 is greater than 2, the switching mode output portion 310 selects a switching mode [1] and outputs: switching mode signal SM=switching mode [1]. In a case where the ongoing operation is a step-up operation and a voltage ratio V2/V0 is smaller than 2, the switching mode output portion 310 selects a switching mode [2] and outputs: switching mode signal SM=switching mode [2].

In a case where the ongoing operation is a step-down operation and a voltage ratio V2/V0 is greater than 2, the switching mode output portion 310 selects a switching mode [3] and outputs: switching mode signal SM=switching mode [3], In a case where the ongoing operation is a step-down operation and a voltage ratio V2/V0 is smaller than 2, the switching mode output portion 310 selects a switching mode [4] and outputs: switching mode signal SM=switching mode [4]. It should be noted that a voltage ratio V2/V0 is 1 or greater independently of operation modes.

The PWM waveform output portion 320 outputs the gate signals G1a, G1b, G2a, and G2b on the basis of the switching mode and a value of the inductor average current command value ILdc*.

In the case of the switching mode [1], the PWM waveform output portion 320 outputs the gate signals G1a, G1b, G2a, and G2b with which an ON-duty of the semiconductor switching elements S1a and S2a is 50% or higher and an ON-duty of the semiconductor switching elements S1b and S2b is 0%.

In the case of the switching mode [2], the PWM waveform output portion 320 outputs the gate signals G1a, G1b, G2a, and G2b with which an ON-duty of the semiconductor switching elements Sa1 and Sa2 is 50% or below and an ON-duty of the semiconductor switching elements. S1b and S2b is 0%.

In the case of the switching mode [3], the PWM waveform output portion 320 outputs the gate signals G1a, G1b, G2a, and G2b with which an ON-duty of the semiconductor switching elements S1a and S2a is 0% and an ON-duty of the semiconductor switching elements S1b and S2b is 50% or below.

In the case of the switching mode [4], the PWM waveform output portion 320 outputs the gate signals G1a, G1b, G2a, and G2b with which an ON-duty of the semiconductor switching elements S1a and S2a is 0% and an ON-duty of the semiconductor switching elements S1b and S2b is 50% or higher.

An operation to convert a DC voltage to a stepped-up or stepped-down DC voltage will now be described.

In a steady state, an average voltage of a voltage Vc1 across the smoothing capacitor (energy transition capacitor) C1 is ½ the DC voltage V2, that is V2/2. Because the DC voltage V2 is charged to the smoothing capacitor C2, applied voltages to the respective semiconductor switching elements S1a, S1b, S2a, and S2b are substantially V2/2. Also, as is described in Non-Patent Document 1, a ripple voltage applied to the inductor L decreases and a frequency of the ripple voltage applied to the inductor L is double the switching frequency. Hence, a small inductor L can be used.

In addition, the gate signals G2a and G2b are signals phase-delayed by 180° with respect to the gate signals G1a and G1b.

Figure 4A:
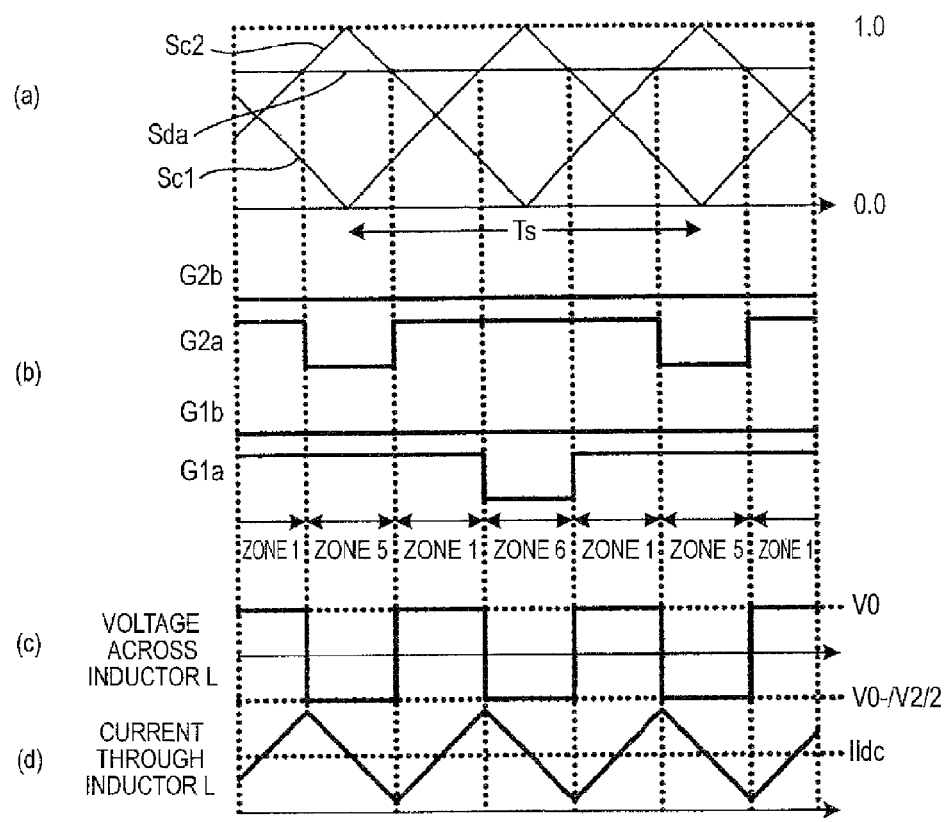
FIG. 4A is a waveform chart showing an operation of the DC-DC power conversion apparatus according to the first embodiment of the invention, that is, a waveform chart of a step-up operation under high load when a voltage ratio is 2 or greater.
Figure 4B:
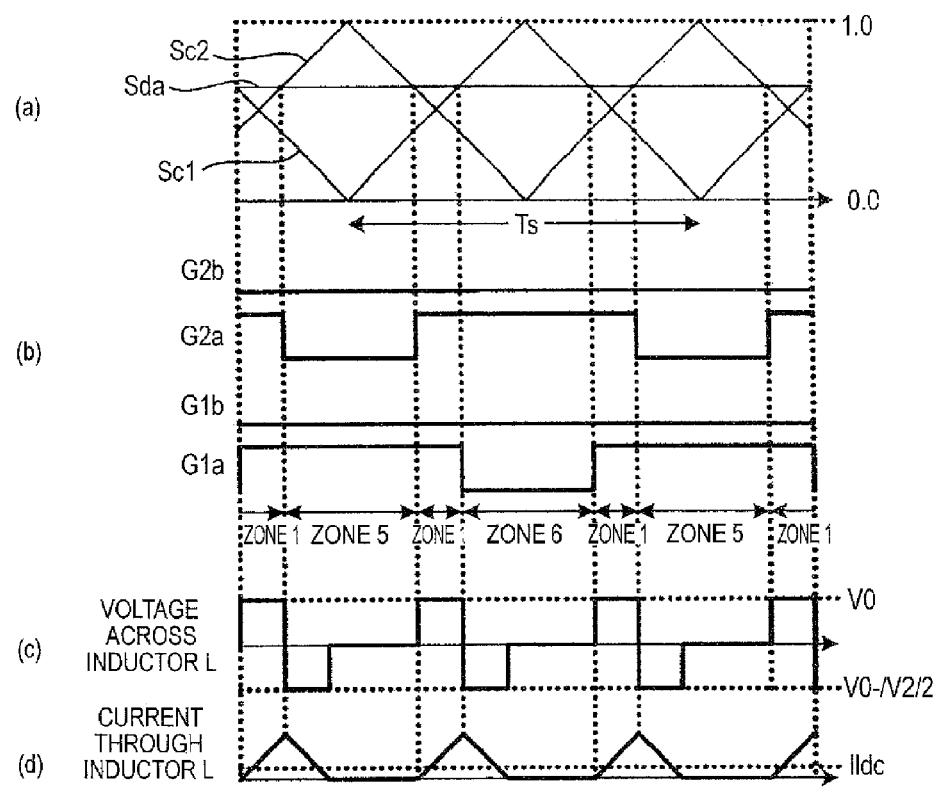
FIG. 4B is a waveform chart showing an operation of the DC-DC power conversion apparatus according to the first embodiment of the invention, that is, a waveform chart of a step-up operation under low load when a voltage ratio is 2 or greater.

FIG. 4A and FIG. 4B are waveform charts in the switching mode [1] showing an operation of the DC-DC power conversion apparatus 10 of the first embodiment to step-up the DC voltage V0 to the DC voltage V2 that is more than double the DC voltage V0 (a voltage ratio V2/V0 is greater than 2 and a direction of power transmission is V0→V2).

FIG. 4A shows a step-up operation in a case where power to be stepped-up from the DC voltage V0 to the DC voltage V2 is large (high load) and this is a current-continuing operation with which an inductor current is always flowing.

FIG. 4B shows a step-up operation in a case where power to be stepped-up from the DC current V0 to the DC voltage V2 is small (low load) and this is a current-discontinuing operation with which there is a period during which no inductor current is flowing.

Figure 5A:
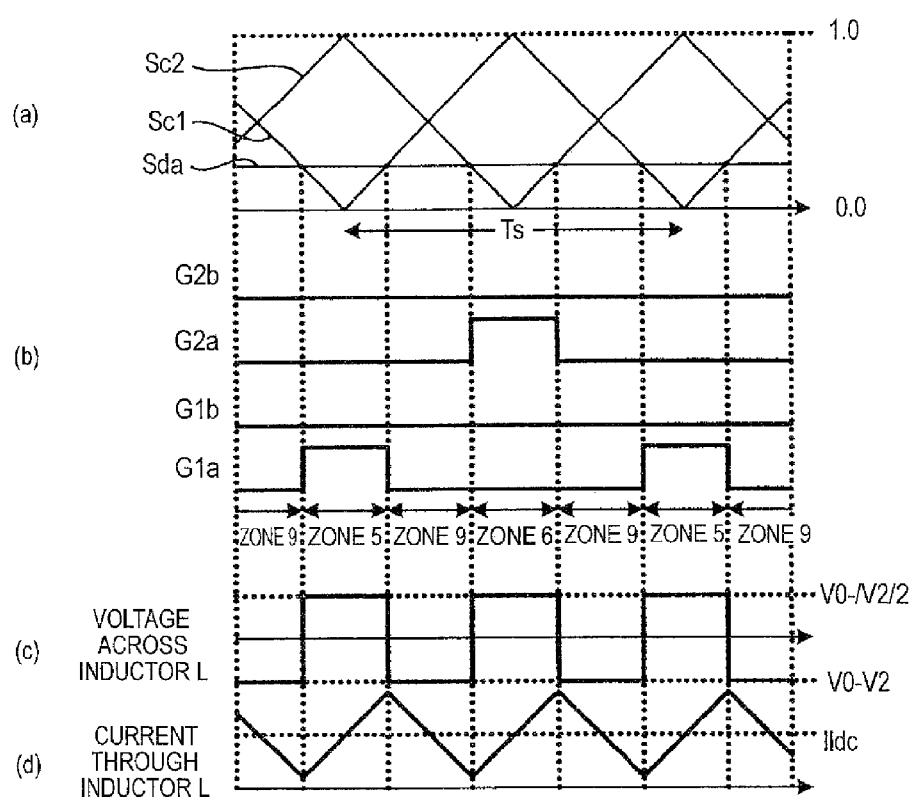
FIG. 5A is a waveform chart showing an operation of the DC-DC power conversion apparatus according to the first embodiment of the invention, that is, a waveform chart of a step-up operation under high load when a voltage ratio is 2 or smaller.
Figure 5B:
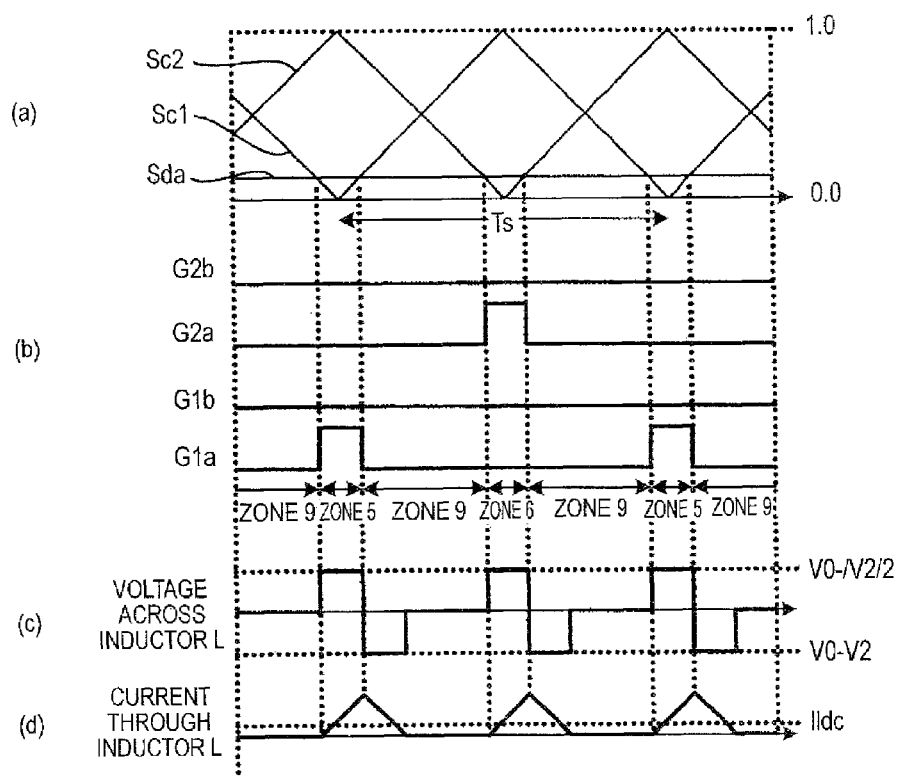
FIG. 5B is a waveform chart showing an operation of the DC-DC power conversion apparatus according to the first embodiment of the invention, that is, a waveform chart of a step-up operation under low load when a voltage ratio is 2 or smaller.

FIG. 5A and FIG. 5B are waveform charts in the switching mode [2] showing an operation of the DC-DC power conversion apparatus 10 of the first embodiment to step-up the DC voltage V0 to the DC voltage V2 that is less than double the DC voltage V0 (a voltage ratio V2/V0 is smaller than 2 and a direction of power transmission is V0→V2).

FIG. 5A shows a step-up operation in a case where power to be stepped-up from the DC voltage V0 to the DC voltage V2 is large (high load) and this is a current-continuing operation with which an inductor current is always flowing.

FIG. 5B shows a step-up operation in a case where power to be stepped-up from the DC current V0 to the DC voltage V2 is small (low load) and this is a current-discontinuing operation with which there is a period during which no inductor current is flowing.

Figure 6A:
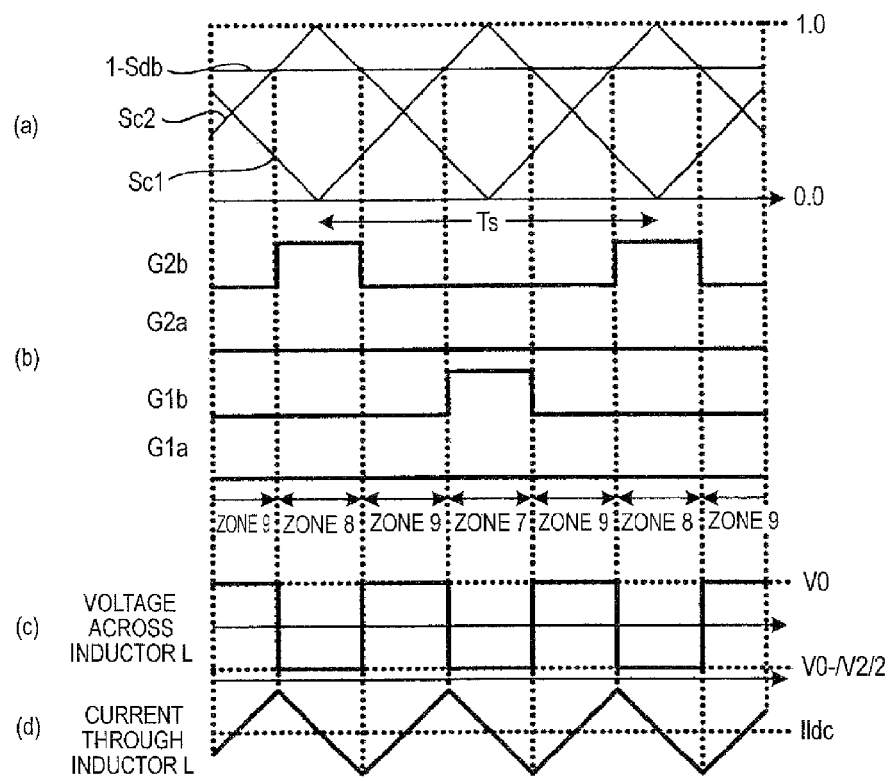
FIG. 6A is a waveform chart showing an operation of the DC-DC power conversion apparatus according to the first embodiment of the invention, that is, a waveform chart of a step-down operation under high load when a voltage ratio is 2 or greater.
Figure 6B:
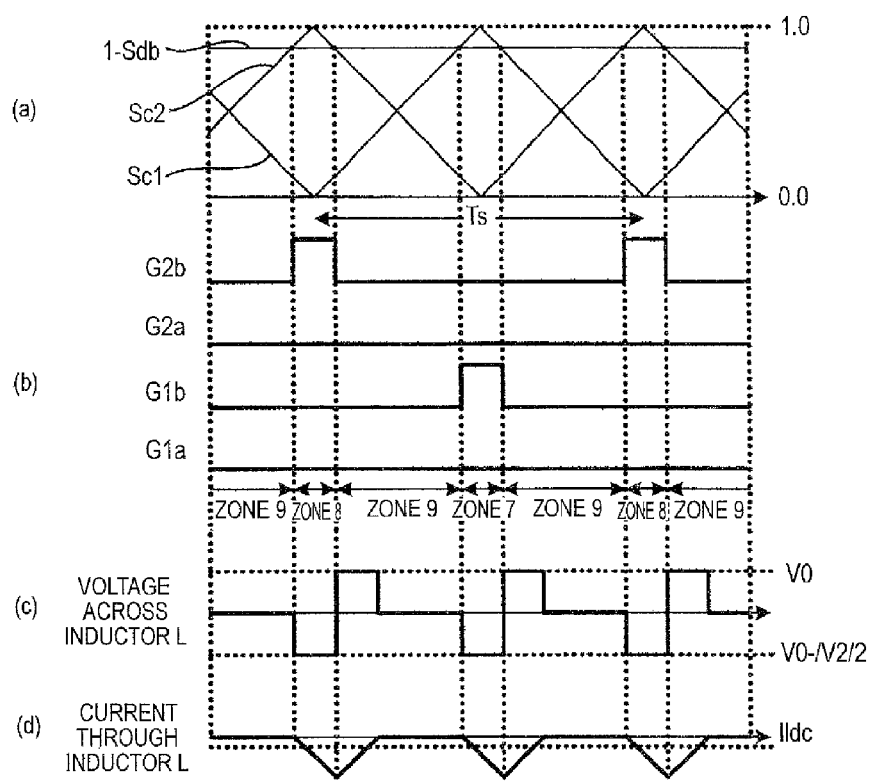
FIG. 6B is a waveform chart showing an operation of the DC-DC power conversion apparatus according to the first embodiment of the invention, that is, a waveform chart of a step-down operation under low load when a voltage ratio is 2 or greater.

FIG. 6A and FIG. 6B are waveform charts in the switching mode [3] showing an operation of the DC-DC power conversion apparatus 10 of the first embodiment to step-down the DC voltage V2 to the DC voltage V0 that is less than ½-time the DC voltage V2 (a voltage ratio V2/V0 is greater than 2 and a direction of power transmission is V2→V0).

FIG. 6A shows a step-down operation in a case where power to be stepped-down from the DC voltage V2 to the DC voltage V0 is large (high load) and this is a current-continuing operation with which an inductor current is always flowing.

FIG. 6B shows a step-down operation in a case where power to be stepped-down from the DC current V2 to the DC voltage V0 is small (low load) and this is a current-discontinuing; operation with which there is a period during which no inductor current is flowing.

Figure 7A:
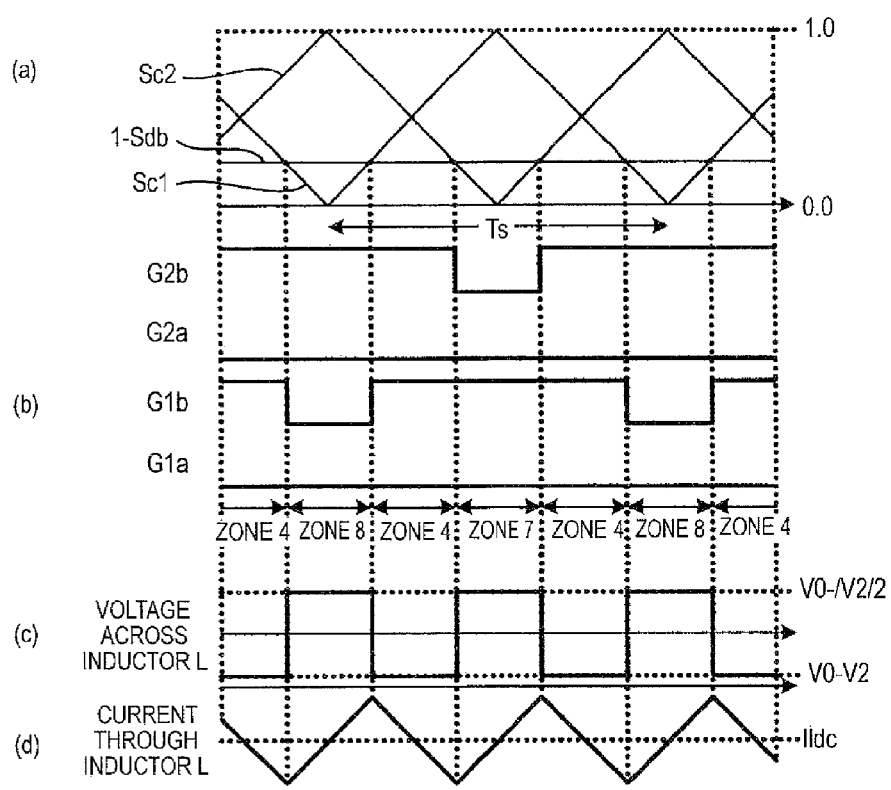
FIG. 7A is a waveform chart showing an operation of the DC-DC power conversion apparatus according to the first embodiment of the invention, that is, a waveform chart of a step-down operation under high load when a voltage ratio is 2 or smaller.
Figure 7B:
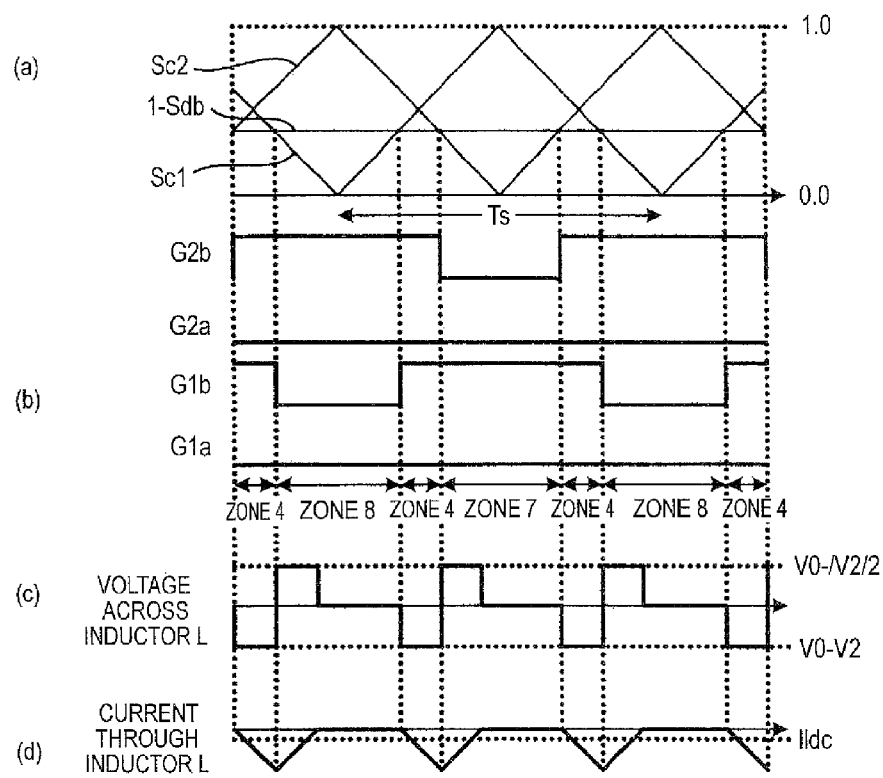
FIG. 7B is a waveform chart showing an operation of the DC-DC power conversion apparatus according to the first embodiment of the invention, that is, a waveform chart of a step-down operation under low load when a voltage ratio is 2 or smaller.

FIG. 7A and FIG. 7B are waveform charts in the switching mode [4] showing an operation of the DC-DC power conversion apparatus 10 of the first embodiment to step-down the DC voltage V2 to the DC voltage V0 that is more than ½-time the DC voltage V2 (a voltage ratio V2/V0 is smaller than 2 and a direction of power transmission is V2→V0).

FIG. 7A shows a step-down operation in a case where power to be stepped-down from the DC voltage V2 to the DC voltage V0 is large (high load) and this is a current-continuing operation with which an inductor current is always flowing.

FIG. 7B shows a step-down operation in a case where power to be stepped-down from the DC current V2 to the DC voltage V0 is small (low load) and this is a current-discontinuing operation with which there is a period during which no inductor current is flowing.

In FIG. 4A, FIG. 4B, FIG. 5A, FIG. 5B, FIG. 6A, FIG. 6B, FIG. 7A, and FIG. 7B, (a) shows chop signals Sc1 and Sc2 and a duty signal Sda (or 1−Sdb), (b) shows the gate signals G1a, G1b, G2a, and G2b, (c) shows a voltage across the inductor L, and (d) shows a current through the inductor L. It should be noted that the abscissa axes of FIG. 4A, FIG. 4B, FIG. 5A, FIG. 5B, FIG. 6A, FIG. 6B, FIG. 7A, and FIG. 7B are common time axes.

In (a) of FIG. 4A, FIG. 4B, FIG. 5A, FIG. 5B, FIG. 6A, FIG. 6B, FIG. 7A, and FIG. 7B, not only the chop signals Sc1 and Sc2 but also one switching cycle Ts is shown along the time axis. This is shown, by way of example, between two adjacent points at which the chop signal Sc1 drops to 0.0.

In (b) of FIG. 4A, FIG. 4B, FIG. 5A, FIG. 5B, FIG. 6A, FIG. 6B, FIG. 7A, and FIG. 7B, not only the gate signals G1a, G1b, G2a, and G2b but also zones 1 through 9 are shown along the time axis.

In (c) of FIG. 4A, FIG. 43, FIG. 5A, FIG. 5B, FIG. 6A, FIG. 6B, FIG. 7A, and FIG. 7B, a voltage across the inductor L is shown by a solid line.

In (d) of FIG. 4A, FIG. 4B, FIG. 5A, FIG. 5B, FIG. 6A, FIG. 6B, FIG. 7A, and FIG. 7B, a current through the inductor L is shown by a solid line and also an average current Ildc is shown by a broken line.

Within the PWM waveform output portion 320, the chop signals Sc1 and Sc2 are compared with the duty signal Sda and the gate signals G1a and G2a are outputted. Also, the chop signals Sc1 and Sc2 are compared with the duty signal Sdb and the gate signals G1b and G2b are outputted.

Cycles of the chop signals Sc1 and Sc2 are denoted by Ts and a phase of the chop signal Sc2 is delayed by 180° with respect to the chop signal Sc1. Also, the chop signals Sc1 and Sc2 are chop signals having amplitude of 1.0. Regarding the chop signals Sc1 and Sc2, magnitude of a signal level corresponding to a valley of chop signals is 0.0 and magnitude of a signal level corresponding to a peak of chop signals is 1.0.

When the duty signal Sda is greater than the chop signal Sc1, the gate signal G1a is a high signal and when the duty signal Sda is smaller than the chop signal Sc1, the gate signal G1a is a low signal. When the duty signal Sda is greater than the chop signal Sc2, the gate signal G2a is a high signal and when the duty signal Sda is smaller than the chop signal Sc2, the gate signal G2a is a low signal.

Also, when (1−Sdb) as the duty signal Sdb is smaller than the chop signal Sc1, the gate signal G1b is a high signal, and when (1−Sdb) is greater than the chop signal Sol, the gate signal G1b is a low signal. When (1−Sdb) is smaller than the chop signal Sc2, the gate signal G2b is a high signal, and when (1−Sdb) is greater than the chop signal Sc2, the gate signal G2b is a low signal.

Also, ON times T1a, T1b, T2a, and T2b in one switching cycle of the semiconductor switching elements S1a, S1b, S2a, and S2b, respectively, are expressed by equations as follows.

$$T1a = Sda \times Ts \quad \text{(Equation 1)}$$

$$T1b = Sdb \times Ts \quad \text{(Equation 2)}$$

$$T2a = Sda \times Ts \quad \text{(Equation 3)}$$

$$T2b = Sdb \times Ts \quad \text{(Equation 4)}$$

A description will be given on the assumption that the zone 1 is a zone in which the gate signal G1a is a high signal, the gate signal G1b is a low signal, the gate signal G2a is a high signal, and the gate signal G2b is a low signal.

Also, the zone 2 is given as a zone in which G1a is a high signal, G1b is a low signal, G2a is a low signal, and G2b is a high signal.

The zone 3 is given as a zone in which G1a is a low signal, G1b is a high signal, G2a is a high signal, and G2b is a low signal.

The zone 4 is given as a zone in which G1a is a low signal, G1b is a high signal, G2a is a low signal, and G2b is a high signal.

The zone 5 is given as a zone in which G1a is a high signal, G1b is a low signal, G2a is a low signal, and G2b is a low signal.

The zone 6 is given as a zone in which G1a is a low signal, G1b is a low signal, G2a is a high signal, and G2b is a low signal.

The zone 7 is given as a zone in which G1a is a low signal, G1b is a high signal, G2a is a low signal, and G2b is a low signal.

The zone 8 is given as a zone in which G1a is a low signal, G1b is a low signal, G2a is a low signal, and G2b is a high signal. The zone 9 is given as a zone in which G1a is a low signal, G1b is a low signal, G2a is a low signal, and G2b is a low signal.

The above is set forth in Table 1 below.

TABLE 1

|     | Zone 1 | Zone 2 | Zone 3 | Zone 4 | Zone 5 | Zone 6 | Zone 7 | Zone 8 | Zone 9 |
| --- | --- | --- | --- | --- | --- | --- | --- | --- | --- |
| G2b | Lo | Hi | Lo | Hi | Lo | Lo | Lo | Hi | Lo |
| G2a | Hi | Lo | Hi | Lo | Lo | Hi | Lo | Lo | Lo |
| G1b | Lo | Lo | Hi | Hi | Lo | Lo | Hi | Lo | Lo |
| G1a | Hi | Hi | Lo | Lo | Hi | Lo | Lo | Lo | Lo |

Lo: low signal
Hi: high signal

Operations in the respective switching modes will now be described.

An operation to step-up the DC voltage V0 to the DC voltage V2 that is more than double the DC voltage V0 (a voltage ratio V2/V0 is greater than 2 and a direction of power transmission is V0→V2) in the switching mode [1] will be described using FIG. 4A and FIG. 4B. As are shown in FIG. 4A and FIG. 4B, in the switching mode [1], an ON-duty of the semiconductor switching elements S1a and S2a is higher than 50% (Sda>50%) and an ON-duty of the semiconductor switching elements S1b and S2b is 0% (Sdb=0%). Hence, one cycle is made up of the zone 1, the zone 5, and the zone 6 and no other zones are present.

Also, times Ts1, Ts5, and Ts6 of the zone 1, the zone 5, and the zone 6, respectively, in one switching cycle are expressed by equations below. For the zone 1 occurring twig in one cycle, Ts1 is a time per occurrence.

$$Ts5 = (1-Sda) \times Ts \quad \text{(Equation 5)}$$

$$Ts6 = (1-Sda) \times Ts \quad \text{(Equation 6)}$$

$$Ts1 = (Ts-Ts5-Ts6)/2 = (Sda-0.5)Ts \quad \text{(Equation 7)}$$

Firstly, a step-up operation in a case where power to be stepped-up from the DC voltage V0 to the DC voltage V2 is large (high load) will be described below with reference to FIG. 4A.

In the case of a high load, a current in a normal direction is always flowing through the inductor.

In the zone 1, because the gate signals G1a and G2a are high signals and therefore the semiconductor switching elements S1a and S2a are ON, a current flows in a path specified below and the voltage V0 is applied to the inductor L. For ease of description, a voltage drop across the semiconductor switching elements and the capacitors is 0.

Capacitor C0→inductor L→IGBT of semiconductor switching element S1a→IGBT of semiconductor switching element S2a In the zone 6, because the semiconductor switching element S2a is ON, a current flows in a path specified below and a voltage (V0−V2/2) is applied to the inductor L.

Capacitor C0→Inductor L→diode of semiconductor switching element S1b→capacitor C1→IGBT of semiconductor switching element S2a In the zone 5, because the semiconductor switching element S1a is ON, a current flows in a path specified below and a voltage (V0−V2/2) is applied to the inductor L.

Capacitor C0→inductor L→IGBT of semiconductor switching element S1a→capacitor C1→diode of semiconductor switching element S2b→capacitor C2

A relation between the duty signal Sda and the input/output DC voltages V0 and V2 will also be described.

In a steady state, an average voltage across the inductor L in one switching cycle is 0 by neglecting a voltage drop caused by a resistance component and expressed as below, which is rewritten as Equation 8 below.

$$0 = ((V0-V2/2) \times (Ts5+Ts6)V0 \times (2 \times Ts1))/Ts$$

$$V0 = (1-Sda) \times V2 \quad \text{(Equation 8)}$$

As is obvious from Equation 8 above, by controlling the duty signal Sda under high load, it becomes possible to control a voltage ratio of the input/output DC voltages V0 and V2.

A step-up operation in a case where power to be stepped-up from the DC voltage V0 to the DC voltage V2 is small (low load) will now be described below with reference to FIG. 4B.

An operation in one cycle will be described in order of the zone 1, the zone 6, the zone 1, and the zone 5 in time sequence. In the case of a low load, there is a period during which a current through the inductor L remains 0.

In the zone 1, because the gate signals G1a and G2a are high signals and therefore the semiconductor switching elements S1a and S2a are ON, a voltage is applied to the inductor L and a current starts to flow in a path specified in the following.

Capacitor C0→inductor L→IGBT of semiconductor switching element S1a→IGBT of semiconductor switching element S2a The DC voltage V0 is applied to the inductor L and the current increases from 0.

In the zone 6, because the semiconductor switching element S2a is ON, a current flows in a path specified below at the beginning.

Capacitor C0→inductor L→diode of semiconductor switching element S1b→capacitor C1→IGBT of semiconductor switching element S2a In this instance, an applied voltage to the inductor L is a negative voltage, (V0−V2/2), and therefore an inductor current decreases. As the inductor current decreases, the current eventually becomes 0 at a midpoint in the zone 6 and the current remains 0 for the rest of the period in the zone 6.

In the zone 1, the current flows in the same manner as described above.

In the zone 5, because the semiconductor switching element S1a is ON, a current flows in a path specified below at the beginning.

Capacitor C0→inductor L→IGBT of semiconductor switching element S1a→capacitor C1→diode of semiconductor switching element S2b→capacitor C2

In this instance, an applied voltage to the inductor L is a negative voltage, (V0−V2/2), and therefore an inductor current decreases. As the inductor current decreases, the current eventually becomes 0 at a midpoint in the zone 5 and the current remains 0 for the rest of the period in the zone 5.

In this manner, a current-discontinuing operation with which a current through the inductor L becomes 0 at midpoints in the zone 6 and the zone 5 is performed and losses in the inductor L, the semiconductor switching elements S1a, S1b, S2a, and S2b, and the capacitor C1 are lessened.

A relation between the duty signal Sda and the input/output DC voltages V0 and V2 will now be described. Firstly, an average current Ildc of the inductor L will be described.

In the zone 1, the voltage V0 is applied to the inductor. With the use of an inductance value L of the inductor, an inductor maximum current Ilmax is expressed by Equation 9 as follows.

$$Ilmax = V0 \times Ts1/L = V0(Sda-0.5)Ts/L \quad \text{(Equation 9)}$$

Also, given that a zone 61 is a zone in which a current is flowing through the inductor in the zone 6.

Let Ts61 be a time of the zone 61. Then, because a voltage (V0−V2/2) is applied to the inductor in the zone 61 and a current through the inductor eventually becomes 0, Ts61 is expressed by Equation 10 as follows.

$$Ts61 = L \times Ilmax/(V2/2-V0) = (V0/(V2/2-V0)) \times (Sda-0.5)Ts \quad \text{(Equation 10)}$$

Also, given that a zone 51 is a zone in which a current is flowing through the inductor in the zone 5. Let Ts51 be a time of the zone 51, then Equation 11 below is obtained in the same manner.

$$Ts51 = (V0/(V2/2-V0)) \times (Sda-0.5)Ts \quad \text{(Equation 11)}$$

Subsequently, the inductor average current Ildc that is an average current in one cycle of the inductor is expressed by Equation 12 as follows.

$$Ildc = 0.5 \times Ilmax \times ((Ts1+Ts51)+(Ts1+Ts61))/Ts = 0.5 \times (V0 \times V2/(V2/2-V0)) \times (Sda-0.5)^2 Ts/L \quad \text{(Equation 12)}$$

Also, power P to be stepped-up from the DC voltage V0 to the stepped-up DC voltage V2 can be expressed by Equation 13 below. Hence, by adjusting an ON-duty (duty signal Sda) of the semiconductor switching elements S1a and S2a, it becomes possible to adjust the power P.

$$P = V0 \times Ildc = 0.5 \times (V0^2 \times V2/(V2/2-V0)) \times (Sda-0.5)^2 Ts/L \quad \text{(Equation 13)}$$

In a case where the power P to be stepped-up is larger than power consumed in the inverter INV, a difference in power is charged to the capacitor C2. Consequently, the DC voltage V2 rises. Conversely, in a case where the power P to be stepped-up is smaller than power consumed in the inverter INV, the capacitor C2 is discharged. Consequently, the DC voltage V2 drops. In the case of a low load, too, by adjusting an ON-duty (duty signal Sda) of the semiconductor switching elements S1a and S2a, it becomes possible to control the power P and hence to control a voltage ratio of the DC voltages V0 and V2.

In this manner, in an operation to step-up the DC voltage V0 to the DC voltage V2 that is more than double the DC voltage V0 (a voltage ratio V2/V0 is greater than 2 and a direction of power transmission is V0→V2), by selecting the switching mode [1] in which an ON-duty of the semiconductor switching elements S1a and S2a is higher than 50% (Sda>50%) and an ON-duty of the semiconductor switching elements S1b and S2b is 0% (Sdb=0%), it becomes possible to control a voltage ratio of the DC voltages V0 and V2.

Also, even when an inductor having a small inductance value is used, a current-discontinuing operation with which an inductor current becomes 0 is performed under low load and losses in the inductor L, the semiconductor switching elements S1a, S1b, S2a, and S2b, and the capacitor C1 are lessened.

An operation to step-up the DC voltage V0 to the DC voltage V2 that is less than double the DC voltage V0 (a voltage ratio V2/V0 is smaller than 2 and a direction of power transmission is V0→V2) in the switching mode [2] will be described using FIG. 5A and FIG. 5B.

As are shown in FIG. 5A and FIG. 5B, in the switching mode [2], an ON-duty of the semiconductor switching elements S1a and S2a is lower than 50% (Sda<50%) and an ON-duty of the semiconductor switching elements S1b and S2b is 0% (Sdb=0%) hence, one cycle is made up of the zone 9, the zone 5, and the zone 6 and no other zones are present.

Also, times Ts9, Ts5, and Ts6 of the zone 9, the zone 5, and the zone 6, respectively, in one switching cycle are expressed as below. For the zone 9 occurring twice in one cycle, Ts9 is a time per occurrence.

$$Ts5 = Sda \times Ts \quad \text{(Equation 14)}$$

$$Ts6 = Sda \times Ts \quad \text{(Equation 15)}$$

$$Ts9 = (Ts-Ts5-Ts6)/2 = (0.5-Sda)Ts \quad \text{(Equation 16)}$$

Firstly, a step-up operation in a case where power to be stepped-up from the DC voltage V0 to the DC voltage V2 is large (high load) will be described below with reference to FIG. 5A. In the case of a high load, a current in a normal direction is always flowing through the inductor.

In the zone 5, because the gate signal G1a is a high signal and therefore the semiconductor switching element S1a is ON, a current flows in a path specified below and a voltage (V0−V2/2) is applied to the inductor L.

Capacitor C0→inductor L→IGBT of semiconductor switching element S1a→capacitor C1→diode of semiconductor switching element S2b→capacitor C2

In the zone 9, because all the semiconductor switching elements are OFF, a current flows in a path specified below and a voltage (V0−V2) is applied to the inductor L.

Capacitor C0→Inductor L→diode of semiconductor switching element S1b→diode of semiconductor switching element S2b→capacitor C2

In the zone 6, because the gate signal G2a is a high signal and therefore the semiconductor switching element S2a is ON, a voltage is applied to the inductor L. Hence, a current flows in a path specified below and a voltage (V0−V2/2) is applied to the inductor L.

Capacitor C0→inductor L→diode of semiconductor switching element S1b→capacitor C1→IGBT of semiconductor switching element S2a Also, a relation between the duty signal Sda and the input/output DC voltages V0 and V2 will also be described.

In a steady state, an average voltage across the inductor L in one switching cycle is 0 and expressed by Equation 17 as follows.

$$0 = ((V0-V2/2) \times (Ts5+Ts6)(V0-V2) \times (2 \times Ts9))/Ts$$

$$V0 = (1-Sda) \times V2 \quad \text{(Equation 17)}$$

In this manner, by controlling the duty signal Sda under high load, it becomes possible to control a voltage ratio of the input/output DC voltages V0 and V2.

A step-up operation in a case where power to be stepped-up from the DC voltage V0 to the DC voltage V2 is small (low load) will now be described below with reference to FIG. 5B.

An operation in one cycle will be described in order of the zone 5, the zone 9, the zone 6, and the zone 9 in time sequence. In the case of a low load, there is a period during which a current through the inductor L remains 0.

In the zone 5, because the gate signal G1a is a high signal and therefore the semiconductor switching element S1a is ON, a voltage is applied to the inductor L and a current starts to flow in a path specified in the following.

Capacitor C0→inductor L→IGBT of semiconductor switching element S1a→capacitor C1→diode of semiconductor switching element S2b→capacitor C2

A DC voltage (V0−V2/2) is applied to the inductor L and the current increases from 0.

In the zone 9, because all the semiconductor switching elements are OFF, a current flows in a path specified below at the beginning.

Capacitor C0→inductor L→diode of semiconductor switching element S1b→diode of semiconductor switching element S2b→capacitor C2

In this instance, an applied voltage to the inductor L is a negative voltage, (V0−V2), and an inductor current decreases. As the inductor current decreases, the current eventually becomes 0 at a midpoint in the zone 9 and the current remains 0 for the rest of the period in the zone 9.

Likewise, in the zone 6, because the gate signal G2a is a high signal and therefore the semiconductor switching element S2a is ON, a voltage is applied to the inductor L and a current starts to flow in a path specified in the following.

Capacitor C0→inductor L→diode of semiconductor switching element S1b→capacitor C1→IGBT of semiconductor switching element S2a A voltage (V0−V2/2) is applied to the inductor L and the current increases from 0.

In the zone 9, a current flows in the same manner as described for the zone 9 above.

In this manner, a current-discontinuing operation with which a current through the inductor L becomes 0 at a midpoint in the zone 9 is performed, and losses in the inductor L, the semiconductor switching elements S1a, S1b, S2a, and S2b, and the capacitor C1 are lessened due to the presence of a period during which the current becomes 0.

A relation between the duty signal Sda and the input/output DC voltages V0 and V2 will now be described. Firstly, an average current Ildc of the inductor L will be described.

In the zones 5 and 6, a voltage (V0−V2/2) is applied to the inductor. With the use of an inductance value L of the inductor, an inductor maximum current Ilmax is expressed by Equation 18 as follows.

$$Ilmax=(V0-V2/2)\times Ts5/L=(V0-V2/2)\times Sda\times Ts/L \quad \text{(Equation 18)}$$

Also, given that a zone 91 is a zone in which a current is flowing through the inductor in the zone 9. Let Ts91 be a time of the zone 91. Then, because a voltage (V0−V2) is applied to the inductor in the zone 91 and a current through the inductor eventually becomes 0, Ts91 is expressed by Equation 19 as follows.

$$Ts91=L\times Ilmax/(V2-V0)=((V0-V2/2)/(V2-V0))\times Sda\times Ts \quad \text{(Equation 19)}$$

Subsequently, the inductor average current Ildc that is an average current in one cycle of the inductor is expressed by Equation 20 as follows.

$$Ildc=0.5\times Ilmax\times((Ts5+Ts91)+(Ts6+Ts91))/Ts=0.5\times (V2(V0-V2/2)/V2-V0))\times Sda^2\times Ts/L \quad \text{(Equation 20)}$$

Also, power P to be stepped-up from the DC voltage V0 to the stepped-up DC voltage V2 can be expressed by Equation. 21 below. Hence, by adjusting an ON-duty (duty signal Sda) of the semiconductor switching elements S1a and S2a, it becomes possible to adjust the power P.

$$P=V0\times Ildc=0.5\times(V0\times V2(V0-V2/2)/(V2-V0))\times Sda^2\times Ts/L \quad \text{(Equation 21)}$$

In the case of a low load, too, by adjusting an ON-duty (duty signal Sda) of the semiconductor switching elements S1a and S2a, it becomes possible to control the power P and hence to control a voltage ratio of the DC voltages V0 and V2.

In this manner, in an operation to step-up the DC voltage V0 to the DC voltage V2 that is less than double the DC voltage V0 (a voltage ratio V2/V0 is smaller than 2 and a direction of power transmission is V0→V2), by selecting the switching mode [2] in which an ON-duty of the semiconductor switching elements S1a and S2a is lower than 50% (Sda<50%) and an ON-duty of the semiconductor switching elements S1b and S2b is 0% (Sdb=0%), it becomes possible to control a voltage ratio of the DC voltages V0 and V2.

Also, even when an inductor having a small inductance value is used, a current-discontinuing operation with which an inductor current becomes 0 is performed under low load and losses in the inductor L, the semiconductor switching elements S1a, S1b, S2a, and S2b, and the capacitor C1 are lessened.

An operation to step-down the DC voltage V2 to the DC voltage V0 that is less than ½-time the DC voltage V2 (a voltage ratio V2/V0 is greater than 2 and a direction of power transmission is V2→V0) in the switching mode [3] will be described using FIG. 6A and FIG. 6B. As are shown in FIG. 6A and FIG. 6B, in the switching mode [3], an ON-duty of the semiconductor switching elements S1b and S2b is lower than 50% (Sdb<50%) and an ON-duty of the semiconductor switching elements S1a and S2a is 0% (Sda=0%). Hence, one cycle is made up of the zone 8, the zone 9, and the zone 7 and no other zones are present.

Also, times Ts8, Ts9, and Ts7 of the zone 8, the zone 9, and the zone 7, respectively, in one switching cycle are expressed as below. For the zone 9 occurring twice in one cycle, Ts9 is a time per occurrence.

$$Ts8=Sdb\times Ts \quad \text{(Equation 22)}$$

$$Ts7=Sdb\times Ts \quad \text{(Equation 23)}$$

$$Ts9=(Ts-Ts7-Ts8)/2=(0.5-Sdb)Ts \quad \text{(Equation 24)}$$

Firstly, a step-down operation in a case where power to be stepped-down from the DC voltage V2 to the DC voltage V0 is large (high load) will be described below with reference to FIG. 6A. In the case of a high load, a current in a negative direction is always flowing through the inductor.

In the zone 8, because the gate signal G2b is a high signal and therefore the semiconductor switching element S2b is ON, a current flows in a path specified below and a voltage (V0−V2/2) is applied to the inductor L.

Capacitor C2→IGBT of semiconductor switching element Sb2→capacitor C1→diode of semiconductor switching element S1a→inductor L→capacitor C0

In the zone 9, because all the semiconductor switching elements are OFF, a current flows in a path specified below and a voltage (V0−V2) is applied to the inductor L.

Diode of semiconductor switching element S2a→diode of semiconductor switching element S1a→inductor L→capacitor C0

In the zone 7, because the gate signal G1b is a high signal and therefore the semiconductor switching element S1b is ON, a current flows in a path specified below and a voltage (V0−V2/2) is applied to the inductor L.

Diode of semiconductor switching element S2a→capacitor C1→IGBT of semiconductor switching element S1b→inductor L→capacitor C0

Also, a relation between the duty signal Sdb and the input/output DC voltages V0 and V2 will also be described.

In a steady state, an average voltage across the inductor L in one switching cycle is 0 and a relation expressed below is established.

$$0=((V0-V2/2)\times(Ts8+Ts7)+V0\times(2\times Ts9))/Ts$$

$$V0=Sdb\times V2 \quad \text{(Equation 25)}$$

In this manner, by controlling the duty signal Sdb under high load, it becomes possible to control a voltage ratio of the input/output DC voltages V0 and V2.

A step-down operation in a case where power to be stepped-down from the DC voltage V2 to the DC voltage V0 is small (low load) will now be described below with reference to FIG. 6B.

An operation in one cycle will be described in order of the zone 8, the zone 9, the zone 7, and the zone 9 in time sequence. In the case of a low load, there is a period during which a current through the inductor L remains 0.

In the zone 8, because the gate signal G2b is a high signal and therefore the semiconductor switching element S2b is ON, a voltage is applied to the inductor L and a current starts to flow in a path specified in the following.

Capacitor C2→IGBT of semiconductor switching element S2b→capacitor C1→diode of semiconductor switching element S1a→inductor L→capacitor C0

A negative voltage (V0−V2/2) is applied to the inductor L and the current increases in a negative direction.

In the zone 9, because all the semiconductor switching elements are OFF, a current flows in a path specified below at the beginning.

Diode of semiconductor switching element S2a→diode of semiconductor switching element S1a→inductor L→capacitor C0

In this instance, an applied voltage to the inductor L is V0 that is a positive voltage. Hence, an inductor current flowing in a negative direction decreases.

As the inductor current decreases, the current eventually becomes 0 at a midpoint in the zone 9 and the current remains 0 for the rest of the period in the zone 9.

Likewise, in the zone 7, because the gate signal G1b is a high signal and therefore the semiconductor switching element S1b is ON, a voltage is applied to the inductor L and a current starts to flow in a path specified in the following.

Diode of semiconductor switching element S2a→capacitor C1→IGBT of semiconductor switching element S1b→inductor L→capacitor C0

A voltage (V0−V2/2) is applied to the inductor L and a current increases in a negative direction.

In the zone 9, a current flows in the same manner as described above.

In this manner, a current-discontinuing operation with which a current through the inductor L becomes 0 at a midpoint in the zone 9 is performed and losses in the inductor L, the semiconductor switching elements S1a, S1b, S2a, and S2b, and the capacitor C1 are lessened.

Also, a relation between the duty signal Sdb and the input/output DC voltages V0 and V2 will now be described. Firstly, an average current Ildc of the inductor L will be described.

In the zones 8 and 7, a voltage (V0−V2/2) is applied to the inductor. With the use of an inductance value L of the inductor, an inductor minimum current Ilmin is expressed by Equation 26 as follows.

$$Il\min=(V0-V2/2)\times Ts8/L=-(V2/2-V0)\times Sdb\times Ts/L \quad \text{(Equation 26)}$$

Also, given that a zone 91 is a zone in which a current is flowing through the inductor in the zone 9. Let Ts91 be a time of the zone 91. Then, because the voltage V0 is applied to the inductor in the zone 91 and a current through the inductor eventually becomes 0, Ts91 is expressed by Equation 27 as follows.

$$Ts91=-L\times Il\min/V0=((V2/2-V0)/V0)\times Sdb\times Ts \quad \text{(Equation 27)}$$

Subsequently, the inductor average current Ildc that is an average current in one cycle of the inductor is expressed by Equation 28 as follows.

$$Ildc=0.5\times Il\min\times((Ts8+Ts91)+(Ts7+Ts91))/Ts=-0.5\times (V2(V2/2-V0)/V0)\times Sdb^2\times Ts/L \quad \text{(Equation 28)}$$

Also, power P to be stepped-down from the DC voltage V2 to the stepped-down DC voltage V0 can be expressed by Equation 29 below. Hence, by adjusting an ON-duty (duty signal Sdb) of the semiconductor switching elements S1b and S2b, it becomes possible to adjust the power P.

Herein, assume that the power P is stepped-down in a normal direction.

$$P=-V0\times Ildc=0.5\times V2(V2/2-V0)\times Sdb^2\times Ta/L \quad \text{(Equation 29)}$$

In the case of a low load, too, by adjusting an ON-duty (duty signal Sdb) of the semiconductor switching elements S1b and S2b, it becomes possible to control the power P and hence to control a voltage ratio of the DC voltages V0 and V2.

In this manner, in an operation to step-down the DC voltage V2 to the DC voltage V0 that is less than ½-time the DC voltage V2 (a voltage ratio V2/V0 is greater than 2 and a direction of power transmission is V2→V0), by selecting the switching mode [3] in which an ON-duty of the semiconductor switching elements S1b and S2b is lower than 50% (Sdb<50%) and an ON-duty of the semiconductor switching elements S1a and S2a is 0% (Sda=0%), it becomes possible to control a voltage ratio of the DC voltages V0 and V2.

Also, even when an inductor having a small inductance value is used, a current-discontinuing operation with which an inductor current becomes 0 is performed under low load and losses in the inductor L, the semiconductor switching elements S1a, S1b, S2a, and S2b, and the capacitor C1 are lessened.

An operation to step-down the DC voltage V2 to the DC voltage V0 that is more than ½-time the DC voltage V2 (a voltage ratio V2/V0 is smaller than 2 and a direction of power transmission is V2→V0) in the switching mode [4] will be described using FIG. 7A and FIG. 7B. As are shown in FIG. 7A and FIG. 7B, in the switching mode [4], an ON-duty of the semiconductor switching elements S1b and S2b is higher than 50% (Sdb>50%) and an ON-duty of the semiconductor switching elements S1a and S2a is 0% (Sda=0%). Hence, one cycle is made up of the zone 8, the zone 7, and the zone 4 and no other zones are present.

Also, times Ts8, Ts7, and Ts4 of the zone 8, the zone 7, and the zone 4, respectively, in one switching cycle are expressed as below. For the zone 4 occurring twice in one cycle, Ts4 is a time per occurrence.

$$Ts8=(1-Sdb)\times Ts \quad \text{(Equation 30)}$$

$$Ts7=(1-Sdb)\times Ts \quad \text{(Equation 31)}$$

$$Ts4=(Ts-Ts8-Ts7)/2(Sdb-0.5)Ts \quad \text{(Equation 32)}$$

Firstly, a step-down operation in a case where power to be stepped-down from the DC voltage V2 to the DC voltage V0 is large (high load) will be described below with reference to FIG. 7A.

In the case of a high load, a current in a negative direction is always flowing through the inductor.

In the zone 4, because the gate signals G1b and G2b are high signals and therefore the semiconductor switching elements S1b and S2b are ON, a current flows in a path specified below and a voltage (V0−V2) is applied to the inductor L.

Capacitor C2→IGBT of semiconductor switching element S2b→IGBT of semiconductor switching element S1b→inductor L→capacitor C0

In the zone 7, because the gate signal G1b is a high signal and therefore the semiconductor switching element S1b is ON, a current flows in a path specified below and a voltage (V0−V2/2) is applied to the inductor L.

Diode of semiconductor switching element S2a→capacitor C1→IGBT of semiconductor switching element S1b→inductor L→capacitor C0

In the zone 8, because the gate signal G2b is a high signal and therefore the semiconductor switching element S2b is ON, a current flows in a path specified below and a voltage (V0−V2/2) is applied to the inductor L.

Capacitor C2→IGBT of semiconductor switching element S2b→capacitor C1→diode of semiconductor switching element S1a→inductor L→capacitor C0

A relation between the duty signal Sdb and the input/output DC voltages V0 and V2 will also be described. In a steady state, an average voltage across the inductor in one switching cycle is 0 and a relation expressed below is established.

$$0=((V0-V2/2)\times(Ts8+Ts7)+(V0-V2)\times(2\times Ts4))/Ts$$

$$V0=Sdb\times V2 \quad \text{(Equation 33)}$$

In this manner, by controlling the duty signal Sdb under high load, it becomes possible to control a voltage ratio of the input/output DC voltages V0 and V2.

A step-down operation in a case where power to be stepped-down from the DC voltage V2 to the DC voltage V0 is small (low load) will now be described below with reference to FIG. 7B.

An operation in one cycle will be described in order of the zone 4, the zone 7, the zone 4, and the zone 8 in time sequence. In the case of a low load, there is a period during which a current through the inductor L remains 0.

In the zone 4, because the gate signals G1b and G2b are high signals and therefore the semiconductor switching elements S1b and S2b are ON, a voltage is applied to the inductor L and a current starts to flow in a path specified in the following.

Capacitor C2→IGBT of semiconductor switching element S2b→IGBT of semiconductor switching element S1b→inductor L→capacitor C0

A negative voltage (V0−V2) is applied to the inductor L and the current increases in a negative direction.

In the zone 7, because the gate signal GM is a high signal and therefore the semiconductor switching element S1b is ON, a current flows in a path specified below at the beginning.

Diode of semiconductor switching element S2a→capacitor C1→IGBT of semiconductor switching element S1b→inductor L→capacitor C0

In this instance, an applied voltage to the inductor L is a positive voltage, (V0−V2/2). Hence, an inductor current flowing in a negative direction decreases. As the inductor current decreases, the current eventually becomes 0 at a midpoint in the zone 7 and the current remains 0 for the rest of the period in the zone 7.

In the zone 4, the current flows in the same manner as described above.

In the zone 8, because the gate signal G2b is a high signal and therefore the semiconductor switching element S2b is ON, a current flows in a path specified below at the beginning.

Capacitor C2→IGBT of semiconductor switching element S2b→capacitor C1→diode of semiconductor switching element S1a→inductor L→capacitor C0

In this instance, an applied voltage to the inductor L is a positive voltage, (V0−V2/2), and an inductor current flowing in a negative direction decreases. As the inductor current decreases, the current eventually becomes 0 at a midpoint in the zone 8 and the current remains 0 for the rest of the period in the zone 8.

In this manner, a current-discontinuing operation with which a current through the inductor L becomes 0 at midpoints in the zone 7 and the zone 8 is performed and losses in the inductor L, the semiconductor switching elements S1a, S1b, S2a, and S2b, and the capacitor C1 are lessened.

A relation between the duty signal Sdb and the input/output DC voltages V0 and V2 will now be described. Firstly, an average current Ildc of the inductor L will be described.

In the zone 4, a voltage (V0−V2) is applied to the inductor L and an inductor minimum current Ilmin is expressed by Equation 34 as follows.

$$Ilmin=(V0-V2)\times Ts4/L=-(V2-V0)\times(Sdb-0.5)Ts/L \quad \text{(Equation 34)}$$

Also, given that a zone 71 and a zone 81 are zones in which a current is flowing through the inductor in the zones 7 and 8, respectively. Let Ts71 and Ts81 be times of the zone 71 and the zone 81, respectively. Then, because a voltage (V0−V2/2) is applied to the inductor in the zone 71 and the zone 81 and a current through the inductor eventually becomes 0, Ts71 and Ts81 are expressed by Equation 35 as follows.

$$Ts71=Ts81=-L\times Ilmin/(V0-V2/2)=((V2/2-V0)/(V0-V2/2))(Sdb-0.5)Ts \quad \text{(Equation 35)}$$

Subsequently, an inductor average current Ildc that is an average current in one cycle of the inductor is expressed by Equation 36 as follows.

$$Ildc=0.5\times Ilmin\times((Ts4+Ts71)+(Ts4+Ts81))/Ts=-0.5\times(V2(V2-V0)/(V0-V2/2))\times(Sdb-0.5)^2\times Ts/L \quad \text{(Equation 36)}$$

Also, power P to be stepped-down from the DC voltage V2 to the stepped-down DC voltage V0 can be expressed by Equation 37 below. Hence, by adjusting an ON-duty (duty signal Sdb) of the semiconductor switching elements S1b and S2b, it becomes possible to adjust the power P.

Herein, assume that the power P is stepped-down in a normal direction.

$$P=-V0\times Ildc=0.5\times(V0\times V2(V2-V0)/(V0-V2/2))\times(Sdb-0.5)^2\times Ts/L \quad \text{(Equation 37)}$$

Even in the case of a low load, too, by adjusting an ON-duty (duty signal Sdb) of the semiconductor switching elements S1b and S2b, it becomes possible to control the power P and hence to control a voltage ratio of the DC voltages V0 and V2.

In this manner, in an operation to step-down the DC voltage V2 to the DC voltage V0 that is more than ½-time the DC voltage V2 (a voltage ratio V2/V0 is smaller than 2 and a direction of power transmission is V2→V0), by selecting the switching mode [4] in which an ON-duty of the semiconductor switching elements S1b and S2b is higher than 50% (Sdb>50%) and an ON-duty of the semiconductor switching elements S1a and S2a is 0% (Sda=0%), it becomes possible to control a voltage ratio of the DC voltages V0 and V2.

Also, even when an inductor having a small inductance value is used, a current-discontinuing operation with which an inductor current becomes 0 is performed under low load and losses in the inductor L, the semiconductor switching elements S1a, S1b, S2a, and S2b, and the capacitor C1 are lessened.

For clarity of a function and an advantage of the DC-DC power conversion apparatus according to the first embodiment of the invention, a comparison with an apparatus in the related art will now be described.

For purpose of comparison, a description will be given to a case where switching operations are performed complementarily as in the related art for an operation to step-up the DC voltage V0 to the DC voltage V2 that is more than double the DC voltage V0 (a voltage ratio V2/V0 is greater than 2 and a direction of power transmission is V0→V2) with reference to FIG. 8A and FIG. 8B.

Figure 8A:
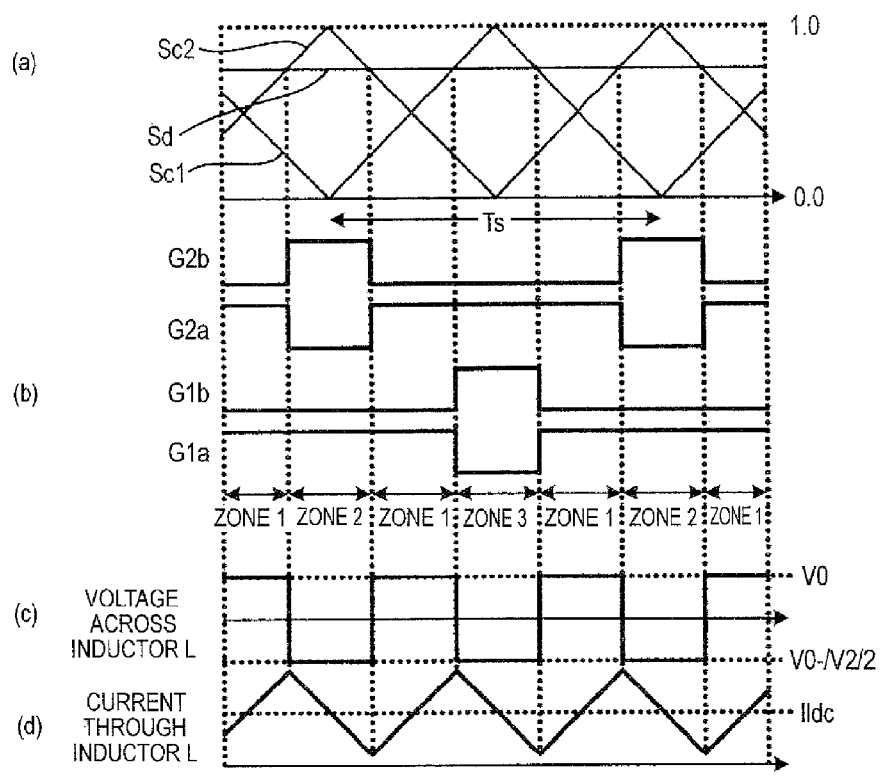
FIG. 8A is a waveform chart showing a step-up operation under high load of a DC-DC power conversion apparatus in the related art.
Figure 8B:
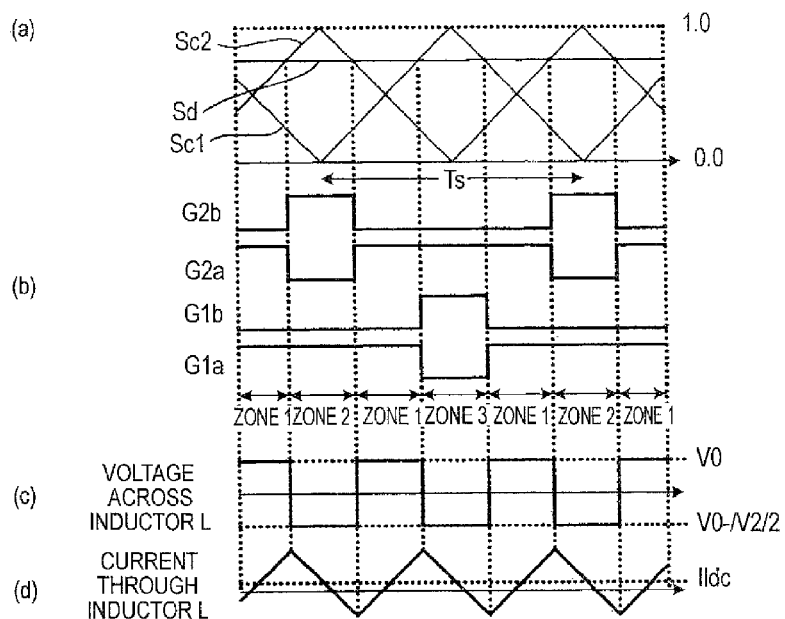
FIG. 8B is a waveform chart showing a step-up operation under low load of a DC-DC power conversion apparatus in the related art.

FIG. 8A shows a step-up operation in a case where power to be stepped-up from the DC voltage V0 to the DC voltage V2 is large (high load) and FIG. 8B shows a step-up operation in a case where power to be stepped-up from the DC voltage V0 to the DC voltage V2 is small (low load).

In a case where complimentary switching operations in the related art are performed, the semiconductor switching elements S1a and S1b perform switching operations complementarily and the semiconductor switching elements S2a and S2b perform switching operations complementarily. As are shown in FIG. 8A and FIG. 8B, one cycle is made up of the zone 1, the zone 2, and the zone 3 and no other zones are present.

In the zone 1, the voltage V0 is applied to the inductor and a voltage (V0−V2/2) is applied to the inductor in the zone 2 and the zone 3. Hence, an inductor current is always flowing.

As is shown in FIG. 8A, as to an operation under high load, a current flowing through the inductor L is the same in the DC-DC power conversion apparatus of the first embodiment and the example of the related art. It should be appreciated, however, that, as is shown in FIG. 8B, a certain ripple current flows through the inductor L even in an operation under low load in the apparatus in the related art.

Figure 9:
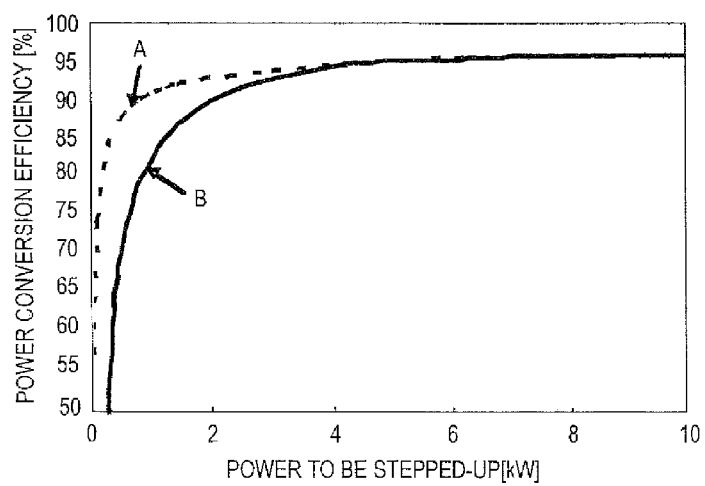
FIG. 9 is a view showing power conversion efficiency of the DC-DC power conversion apparatus according to the first embodiment of the invention.

FIG. 9 shows power conversion efficiency (broken line A) of the DC-DC power conversion apparatus of the first embodiment and power conversion efficiency (solid line B) of the example in the related art in an operation to step-up the DC voltage V0 to the DC voltage V2 that is more than double the DC voltage V0 (a voltage ratio V2/V0 is greater than 2 and a direction of power transmission is V0→V2). As is shown in FIG. 9, when the switching mode [1] is selected, power conversion efficiency of the DC-DC power conversion apparatus of the first embodiment is enhanced when power to be stepped-up is small owing to a current-discontinuing operation with which a current through the inductor becomes 0 in a part of periods. The same applies to the other switching modes.

As has been described, the DC-DC power conversion apparatus according to the first embodiment of the invention has two or more switching units each of which includes two semiconductor switching elements Sa and Sb performing switching operations, which semiconductor switching elements of the respective switching units are all connected in series, an energy transition capacitor for conducting charging/discharging according to the switching operations of the respective semiconductor switching elements of the respective switching units, and an inductor. The DC-DC power conversion apparatus is provided with a control unit that makes the semiconductor switching elements of the switching units execute switching operations in four types of switching modes, according to a ratio of input/output voltages of the DC-DC power conversion apparatus and a direction of power transmission in the DC-DC power conversion apparatus, and also makes the semiconductor switching elements carry out a current-discontinuing operation wherein a current flowing through the inductor becomes 0 during the switching operations under low load. By performing four types of switching modes (switching modes [1] through [4]), it becomes possible to readily control a voltage ratio of the DC voltages V0 and V2. Also, even when a small inductor having a small inductance value is used, a ripple current through the inductor under low load decreases and therefore losses in the energy transition capacitor C1, the inductor L, and the semiconductor switching elements S1a, S1b, S2a, and S2b can be lessened. It thus becomes possible to increase power conversion efficiency under low load.

The four types of switching modes (switching modes [1] through [4]) are as follows. Herein, let V0 be one DC voltage of the DC-DC power conversion apparatus and V2 be the other DC voltage.

Switching Mode [1]

A switching mode in which an ON-duty of one semiconductor switching element Sa of each switching unit is set to 50% or higher when the DC current V0 is stepped-up to the DC voltage V2 that is more than double the DC voltage V0 (a voltage ratio V2/V0 is greater than 2 and a direction of power transmission is V0→V2).

Switching Mode [2]

A switching mode in which an ON-duty of one semiconductor switching element Sa of each switching unit is set to 50% or below when the DC current V0 is stepped-up to the DC voltage V2 that is less than double the DC voltage V0 (a voltage ratio V2/V0 is smaller than 2 and a direction of power transmission is V0→V2).

Switching Mode [0.3]

A switching mode in which an ON-duty of the other semiconductor switching element Sb of each switching unit is set to 50% or below when the DC current V2 is stepped-down to the DC voltage V0 that is less than ½-time the DC voltage V2 (a voltage ratio V2/V0 is greater than 2 and a direction of power transmission is V2→V0).

Switching Mode [4]

A switching mode in which an ON-duty of the other semiconductor switching element Sb of each switching unit is set to 50% or higher when the DC current V2 is stepped-down to the DC voltage V0 that is more than ½-time the DC voltage V2 (a voltage ratio V2/V0 is smaller than 2 and a direction of power transmission is V2→V0).

It should be noted that in a case where a voltage ratio V2/V0 is 2, in the DC-DC power conversion apparatus in the related art adopting complementary switching, too, a voltage applied to the inductor L decreases and so does a ripple current through the inductor L. Accordingly, one more switching mode in which complementary switching takes place may be added, so that this switching mode in which complementary switching takes place is selected in a case where a voltage ratio V2/V0 is in the vicinity of 2.

In the first embodiment, IGBTs and diodes are used as the semiconductor switching elements. It should be appreciated, however, that other semiconductor switching elements formed of MOSFETs and diodes may be used instead.

In the case of MOSFETs, synchronous rectification can be achieved by switching ON the MOSFET while a current is flowing through the diode. Hence, it becomes possible to increase power conversion efficiency further.

Also, Si semiconductors are often used for the semiconductor switching elements. It should be appreciated, however, that wide-gap semiconductors, such as SiC and GaN, can be used as well.

By using wide-gap semiconductors, such as SC and GaN, it becomes possible to lessen a conduction loss and a switching less in the semiconductor switching elements. Hence, it becomes possible to achieve a DC-DC power conversion apparatus with further higher power conversion efficiency.

Second Embodiment

Figure 10:
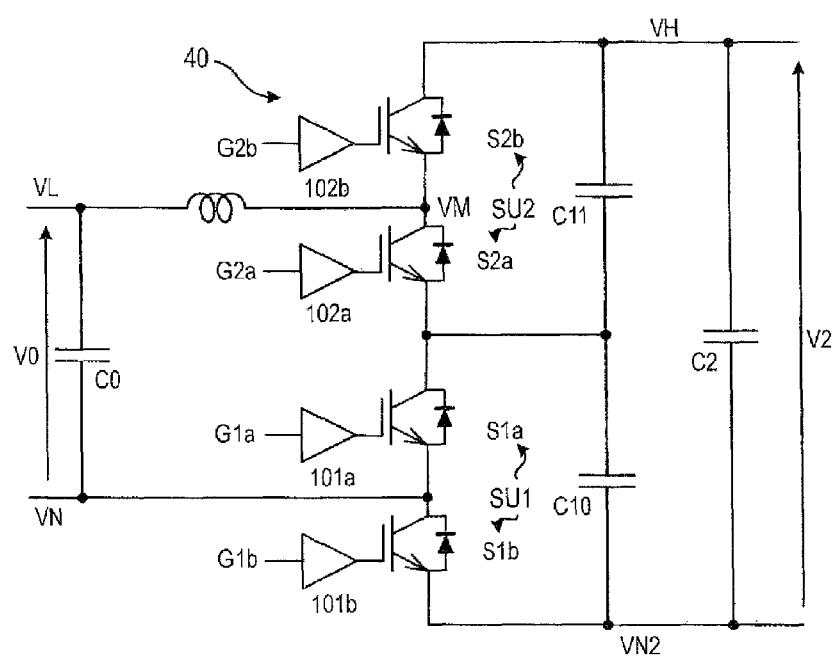
FIG. 10 is an electrical circuit diagram showing a configuration of a main circuit of a DC-DC power conversion apparatus according to a second embodiment of the invention.

FIG. 10 is a circuit diagram showing a configuration of a main circuit of a DC-DC power conversion apparatus according to a second embodiment of the invention.

A DC-DC power conversion apparatus 40 of the second embodiment is a two-way DC-DC power conversion apparatus furnished with a step-up function of converting a DC voltage V0 inputted between a voltage terminal VL and a voltage terminal VN to a stepped-up DC voltage V2 and outputting the DC voltage V2 between a voltage terminal VH and a voltage terminal VN2, and a step-down function of converting the DC voltage V2 inputted between the voltage terminal VH and the voltage terminal VN2 to the stepped-down DC voltage V0 and outputting the DC voltage V0 between the voltage terminal VL and the voltage terminal VN.

As is shown in FIG. 10, the DC-DC power conversion apparatus 40 of the second embodiment is different from the DC-DC power conversion apparatus 10 of the first embodiment above shown in FIG. 1 in a connection configuration of the main circuit. Hereinafter, connections of the main circuit of the DC-DC power conversion apparatus 40 of the second embodiment will be described in detail.

Referring to FIG. 10, an emitter terminal of an IGBT forming a semiconductor switching element S1a is connected to a voltage terminal VN and a collector terminal thereof is connected to a high-voltage end terminal of a smoothing capacitor (energy transition capacitor) C10. An emitter terminal of an IGBT forming a semiconductor switching element S1b is connected to a low-voltage end terminal VN2 of the smoothing capacitor (energy transition capacitor) C10 and a collector terminal thereof is connected to the voltage terminal VN.

An emitter terminal of an IGBT forming a semiconductor switching element S2b is connected to a voltage terminal VM and a collector terminal thereof is connected to a high-voltage end terminal VH of a smoothing capacitor (energy transition capacitor) C11. An emitter terminal of an IGBT forming semiconductor switching element S2a is connected to a high-voltage terminal of the smoothing capacitor (energy transition capacitor) C10 and a low-voltage end terminal of the smoothing capacitor (energy transition capacitor) C11, and a collector terminal thereof is connected to the voltage terminal VM.

In the DC-DC power conversion apparatus 40 of the second embodiment, too, the semiconductor switching elements S1a and S1b perform switching operations and form a switching unit SU1.

Also, the semiconductor switching elements S2a and S2b perform switching operations as well and form a switching unit SU2.

The low-voltage end terminal of the smoothing capacitor C0 is connected to the voltage terminal VN and the high-voltage end terminal of the smoothing capacitor C0 is connected to the voltage terminal VL.

The low-voltage end terminal of the smoothing capacitor C2 is connected to the low-voltage end terminal of the smoothing capacitor (energy transition capacitor) C10 and the high-voltage end terminal of the smoothing capacitor C2 is connected to the high-voltage end terminal of the smoothing capacitor (energy transition capacitor) C11.

The high-voltage end terminal of the smoothing capacitor (energy transition capacitor) C10 and the low-voltage end terminal of the smoothing capacitor (energy transition capacitor) C11 are connected to each other.

One terminal of the inductor L is connected to the voltage terminal VL and the other terminal thereof is connected to the voltage terminal VM. Herein, the smoothing capacitor C2 is used. However, because a series body of the smoothing capacitors (energy transition capacitors) C10 and C11 is connected to the smoothing capacitor C2 in parallel, the smoothing capacitor C2 may be eliminated. The smoothing capacitor C10 and the smoothing capacitor C11 divide a voltage V2 between the voltage terminals VH and VN2 into two halves. Hence, V2/2 is given as a voltage across each of the capacitors C10 and C11.

A gate terminal of the semiconductor switching element S1b is connected to an output terminal of a gate drive circuit 101b and a gate signal G1b is inputted into an input terminal of the gate drive circuit 101b. A gate terminal of the semiconductor switching element S1a is connected town output terminal of a gate drive circuit 101a and a gate signal G1a is inputted into an input terminal of the gate drive circuit 101a. A gate terminal of the semiconductor switching element S2b is connected to an output terminal of a gate drive circuit 102b and a gate signal G2b is inputted into an input terminal of the gate drive circuit 102b. A gate terminal of the semiconductor switching element S2a is connected to an output terminal of a gate drive circuit 102a and a gate signal G2a is inputted into an input terminal of the gate drive circuit 102a.

A control unit of the DC-DC power conversion apparatus 40 of the second embodiment is the same as the control unit of the DC-DC power conversion apparatus 10 of the first embodiment above in configuration and operation.

In the respective switching modes [1] through [4], a voltage across the inductor L is the same as that in the DC-DC power conversion apparatus of the first embodiment above and a current flowing through the inductor L is also the same.

Accordingly, the DC-DC power conversion apparatus of the second embodiment can also obtain the advantage same as that obtained by the DC-DC power conversion apparatus of the first embodiment above.

INDUSTRIAL APPLICABILITY

The invention is effectively used for a DC-DC power conversion apparatus that converts a DC voltage to a stepped-up or stepped-down DC voltage.

DESCRIPTION OF REFERENCE NUMERALS AND SIGNS

C0 through C2, C10, and C11: capacitor
S1a, S1b, S2a, and S2b: semiconductor switching element
SU1 and SU2: switching unit
L: inductor
G1a, G1b, G2a, and G2b: gate signal
VH, VL VN, VN2, and VM: voltage terminal
101a, 101b, 102a, and 102b: gate drive circuit
310: switching mode output portion.
320: PWM waveform output portion
330: step-up/down discrimination portion
340: computation portion
Sda, Sdb, and Sd: duty signal

The invention claimed is:

1. A DC-DC power conversion apparatus including two or more switching units each of which includes two semiconductor switching elements Sa and Sb performing switching operations, which semiconductor switching elements of the respective switching units are all connected in series, an energy transition capacitor for conducting charging/discharging according to the switching operations of the respective semiconductor switching elements of the respective switching units, and an inductor, the DC-DC power conversion apparatus being characterized by comprising:

a control unit that makes the semiconductor switching elements of the switching units execute switching operations in four types of switching modes, according to a ratio of input/output voltages of the DC-DC power conversion apparatus and a direction of power transmission in the DC-DC power conversion apparatus, and also makes the semiconductor switching elements carry out a current-discontinuing operation wherein a current flowing through the inductor becomes 0 during the switching operations under low load.

2. The DC-DC power conversion apparatus according to claim 1, characterized in that:

the control unit sets an ON-duty of one semiconductor switching element Sa of each switching unit to 50% or higher for a step-up operation when an input/output voltage ratio V2/V0 of a low-voltage end DC voltage V0 and a high-voltage end DC voltage V2 of the DC-DC power conversion apparatus is greater than 2 and the direction of power transmission is from the low-voltage end DC voltage V0 to the high-voltage end DC voltage V2.

3. The DC-DC power conversion apparatus according to claim 1, characterized in that:

the control unit sets an ON-duty of one semiconductor switching element Sa of each switching unit to 50% or below for a step-up operation when an input/output voltage ratio V2/V0 of the DC-DC power conversion apparatus is smaller than 2 and the direction of power transmission is from a low-voltage end DC voltage V0 to a high-voltage end DC voltage V2.

4. The DC-DC power conversion apparatus according to claim 1, characterized in that:

the control unit sets an ON-duty of one semiconductor switching element Sb of each switching unit to 50% or below for a step-down operation when an input/output voltage ratio V2/V0 of the DC-DC power conversion apparatus is greater than 2 and the direction of power transmission is from a high-voltage end DC voltage V2 to a low-voltage end DC voltage V0.

5. The DC-DC power conversion apparatus according to claim 1, characterized in that:

the control unit sets an ON-duty of one semiconductor switching element Sb of each switching unit to 50% or higher for a step-down operation when an input/output voltage ratio V2/V0 of the DC-DC power conversion apparatus is smaller than 2 and the direction of power transmission is from a high-voltage end DC voltage V2 to a low-voltage end DC voltage V0.

6. The DC-DC power conversion apparatus according to claim 1, characterized in that the four types of switching modes by the control unit include:

a first switching mode in which an ON-duty of one semiconductor switching element Sa of each switching unit is set to 50% or higher for a step-up operation when an input/output voltage ratio V2/V0 of a low-voltage end DC voltage V0 and a high-voltage end DC voltage V2 of the DC-DC power conversion apparatus is greater than 2 and the direction of power transmission is from the low-voltage end DC voltage V0 to the high-voltage end DC voltage V2;

a second switching mode in which an ON-duty of one semiconductor switching element Sa of each switching unit is set to 50% or below for a step-up operation when the input/output voltage ratio V2/V0 of the DC-DC power conversion apparatus is smaller than 2 and the direction of power transmission is from the low-voltage end DC voltage V0 to the high-voltage end DC voltage V2;

a third switching mode in which an ON-duty of one semiconductor switching element Sb of each switching unit is set to 50% or below for a step-down operation when the input/output voltage ratio V2/V0 of the DC-DC power conversion apparatus is greater than 2 and the direction of power transmission is from the high-voltage end DC voltage V2 to the low-voltage end DC voltage V0; and a fourth switching mode in which an ON-duty of one semiconductor switching element Sb of each switching unit is set to 50% or higher for a step-down operation when the input/output voltage ratio V2/V0 of the DC-DC power conversion apparatus is smaller than 2 and the direction of power transmission is from the high-voltage end DC voltage V2 to the low-voltage end DC voltage V0.

7. The DC-DC power conversion apparatus according to claim 1, characterized in that:

the control unit makes the semiconductor switching elements Sa and Sb of the switching units execute complimentary switching when an input/output voltage ratio V2/V0 of the DC-DC power conversion apparatus is 2.

8. The DC-DC power conversion apparatus according to claim 1, characterized in that:

the semiconductor switching elements are wide-gap semiconductors including SiC and GaN.

* * * * *